(12) United States Patent
Gulisano

(10) Patent No.: US 6,196,607 B1
(45) Date of Patent: Mar. 6, 2001

(54) TRIM PANEL ASSEMBLY AND PLASTIC INTERIOR TRIM PANEL FOR USE THEREIN

(75) Inventor: Salvatore J. Gulisano, Fraser, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/392,878

(22) Filed: Sep. 9, 1999

(51) Int. Cl.[7] ................................................... B60R 13/01
(52) U.S. Cl. ..................... 296/39.1; 296/901; 296/146.7; 293/115; 52/511
(58) Field of Search .............................. 296/39.1, 146.7, 296/901; 52/511; 293/115

(56) References Cited

U.S. PATENT DOCUMENTS

| | | | |
|---|---|---|---|
| 4,214,788 | * | 7/1980 | Srock .................................... 296/39.1 |
| 4,270,328 | * | 6/1981 | Page et al. .......................... 296/146.7 |
| 4,472,918 | * | 9/1984 | Mach ....................................... 52/511 |
| 4,505,611 | * | 3/1985 | Nagashima et al. ..................... 52/511 |
| 4,568,215 | * | 2/1986 | Nelson .................................... 52/511 |
| 4,717,301 | * | 1/1988 | Oddenino ............................... 52/511 |
| 4,845,894 | | 7/1989 | Herringshaw et al. . |
| 4,949,508 | | 8/1990 | Elton . |
| 4,957,326 | * | 9/1990 | Chiba et al. .......................... 296/901 |
| 5,419,606 | * | 5/1995 | Hull et al. .............................. 52/511 |
| 5,501,829 | | 3/1996 | Nichols . |
| 5,529,370 | | 6/1996 | Veit . |
| 5,584,144 | | 12/1996 | Hisano . |
| 5,603,548 | | 2/1997 | Gandhi et al. . |
| 5,752,356 | * | 5/1998 | Miklavic et al. ....................... 52/511 |
| 5,820,191 | | 10/1998 | Blakewood et al. . |
| 5,833,303 | * | 11/1998 | Kawai et al. ......................... 296/39.1 |
| 5,865,500 | * | 2/1999 | Sanada et al. ........................ 293/115 |
| 5,934,729 | * | 8/1999 | Baack .................................. 296/39.1 |
| 5,992,914 | * | 11/1999 | Gotoh et al. ........................ 296/39.1 |

FOREIGN PATENT DOCUMENTS

| | | | |
|---|---|---|---|
| 404189625 | * | 7/1992 | (JP) .................................. 296/146.7 |
| 405104952 | * | 4/1993 | (JP) .................................. 296/146.7 |
| 406219224 | * | 8/1994 | (JP) .................................... 293/115 |
| 406270673 | * | 9/1994 | (JP) .................................. 296/146.7 |

* cited by examiner

Primary Examiner—Joseph D. Pape
Assistant Examiner—Kiran B. Patel
(74) Attorney, Agent, or Firm—Brooks & Kushman P.C.

(57) ABSTRACT

An automotive trim panel assembly including a door inner panel and a plastic interior trim panel are provided wherein central axes of substantially identical pin fasteners and main and auxiliary connector portions are all substantially parallel to one another to provide an easy, simple, less costly assembly process. The interior trim panel includes a plastic main section having inner and outer surfaces, a plastic auxiliary section having inner and outer surfaces and a plurality of hollow main connector portions formed about the periphery of the main section on its inner surface thereof. The interior trim panel also includes a hollow base section formed on the inner surface of the auxiliary section and a hollow auxiliary connector portion formed on the base section and supported above the inner surface of the auxiliary section to avoid a dielock condition and to allow a push pin for the auxiliary "flag" section to be parallel to the other push pins without forming a hole in a side wall portion of the "flag" section. This feature eliminates the use of a Class A—surface-marring screw to secure the flag section to its corresponding portion of the inner panel.

12 Claims, 3 Drawing Sheets

TRIM PANEL ASSEMBLY AND PLASTIC INTERIOR TRIM PANEL FOR USE THEREIN

TECHNICAL FIELD

This invention relates to trim panel assemblies and plastic interior trim panels for use therein and, in particular, to automotive trim panel assemblies and plastic interior trim panels.

BACKGROUND ART

When plastic parts need to be secured together, especially in automotive applications, it is often times desirable to use pin fasteners such as push pins rather than screws to make the assembly easier, simpler, less costly and more cosmetically pleasing to the OEM design studio and consumer. A typical push pin is illustrated at reference numeral 10 in FIGS. 3 and 4.

Such a push pin 10 is typically used with a hollow connector portion 12, commonly called a "dog house", which is integrally formed on an inner surface of one of the plastic parts such as a plastic interior trim panel, generally indicated at 14. The trim panel 14 includes a plastic main section generally indicated at 16, and a plastic auxiliary or "flag" section, generally indicated at 18. Use of such "dog houses" 12 and associated push pins 10 produce hidden attachment mechanisms for the plastic parts.

It is generally not difficult to form the connector portions 12 on an inner surface 20 of the main section 16. However, for tooling reasons, such a "dog house" or connector portion typically cannot be formed on an inner surface 22 of the flag section 18. Specifically, the tooling problem is a "locked" lifter or "die lock" condition. Such lifters, which are located within the mold, are used to form the connector portions 12.

Because of this tooling problem, a screw is inserted through an outer surface 24 (FIGS. 3 and 4) of the flag section 18 to fasten the flag section 18 to a corresponding portion 26 of a metallic door inner panel, generally indicated at 28 in FIGS. 3 and 4. However, the outer surface 24 of the flag section 18 is a "Class A" surface. Consequently, the screw mars the outer surface 24.

U.S. Pat. No. 5,501,829 discloses a method of manufacturing trim panels for vehicle doors.

U.S. Pat. No. 5,820,191 discloses a structural inner-door panel for a vehicle that is monolithic and molded as a single piece of polymeric material.

U.S. Pat. No. 5,603,548 discloses an automobile door having an interior trim panel that is connected to a rigid inner structure.

U.S. Pat. No. 5,584,144 discloses a motor vehicle door having an inner panel including an integral mounting base for fastening the bottom of a door pocket to the panel.

U.S. Pat. No. 5,529,370 discloses a trim panel mounting assembly including a trim panel bracket and a support bracket.

U.S. Pat. No. 5,419,606 discloses a trim panel having pins for attaching it to a door panel.

U.S. Pat. No. 4,949,508 discloses a door assembly having a trim panel that is secured by pins.

U.S. Pat. No. 4,845,894 discloses a method for mounting an outer skin to an inner panel of a vehicle door.

SUMMARY OF THE INVENTION

An object of the present invention is to provide a trim panel assembly and a plastic interior trim panel for use therein wherein a conventional pin fastener in combination with a raised hidden connector portion rather than a "surface marring" screw are used to fasten a plastic flag section of the interior trim panel to a corresponding portion of a door inner panel, thereby making the assembly easier, simpler and less costly.

Another object of the present invention is to provide a trim panel assembly and a plastic interior trim panel for use therein wherein substantially identical pin fasteners having central axes can be used to fasten inner and outer panels of the assembly even at a "flag" section of the outer panel and wherein the central axes of all of the pin fasteners are substantially parallel to make the assembly easier, simpler, less costly and esthetically pleasing.

In carrying out the above objects and other objects of the present invention, an automotive trim panel assembly is provided. The assembly includes an inner panel having a plurality of apertures formed therethrough and an interior trim panel including a plastic main section having inner and outer surfaces. The interior trim panel includes a plastic auxiliary section having inner and outer surfaces, a plurality of hollow main connector portions formed about the periphery of the main section on its inner surface thereof, a hollow base section formed on the inner surface of the auxiliary section and a hollow auxiliary connector portion formed on the base section and supported above the inner surface of the auxiliary section. The assembly further includes a plurality of substantially identical pin fasteners having central axes and received and retained within the main and auxiliary connector portions and the plurality of apertures to fasten the inner and interior trim panels together wherein the central axes of the pin fasteners are all substantially parallel to each other.

Preferably, the auxiliary section includes a front wall portion and a side wall portion which extends rearwardly from the front wall section. The side wall portion has a back edge surface interconnecting the inner and outer surfaces of the auxiliary section. The base section includes an upper support surface for supporting the auxiliary connector portion thereon. The back edge surface is substantially coplanar with the upper support surface.

Also, preferably, the base section includes a base portion having the upper support surface and an inner wall portion connected to the front wall portion and supporting the base portion above the inner surface of the auxiliary section.

The inner wall portion is preferably a single inner wall portion connected to the side wall portion.

The outer surface of the auxiliary section is preferably a Class A surface.

The auxiliary section is a flag-shaped section of the interior trim panel and the assembly is a door trim panel assembly.

Further, in carrying out the above object and other objects of the present invention, a plastic automotive interior trim panel for fastening an inner panel thereto is provided. The interior trim panel includes a plastic main section having inner and outer surfaces, a plastic auxiliary section having inner and outer surfaces and a plurality of hollow main connector portions formed about the periphery of the main section on its inner surface thereof. The interior trim panel also includes a hollow base section formed on the inner surface of the auxiliary section and a hollow auxiliary connector portion formed on the base section and supported above the inner surface of the auxiliary section. Each of the main and auxiliary connector portions has a central axis substantially parallel to each of the other central axes.

Preferably, the auxiliary section includes a front wall portion and a side wall portion which extends rearwardly from the front wall section. The side wall portion has a back edge surface interconnecting the inner and outer surfaces of the auxiliary section. The base section includes an upper support surface for supporting the auxiliary connector portion thereon. The back edge surface is substantially coplanar with the upper support surface.

Also, preferably, the base section includes a base portion having the upper support surface and an inner wall portion connected to the front wall portion and supporting the base portion above the inner surface of the auxiliary section.

The inner wall portion is preferably a single inner wall portion connected to the side wall portion.

The outer surface of the auxiliary section is preferably a Class A surface.

The auxiliary section is preferably a flag-shaped section of the interior trim panel and the interior trim panel is a door interior trim panel.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
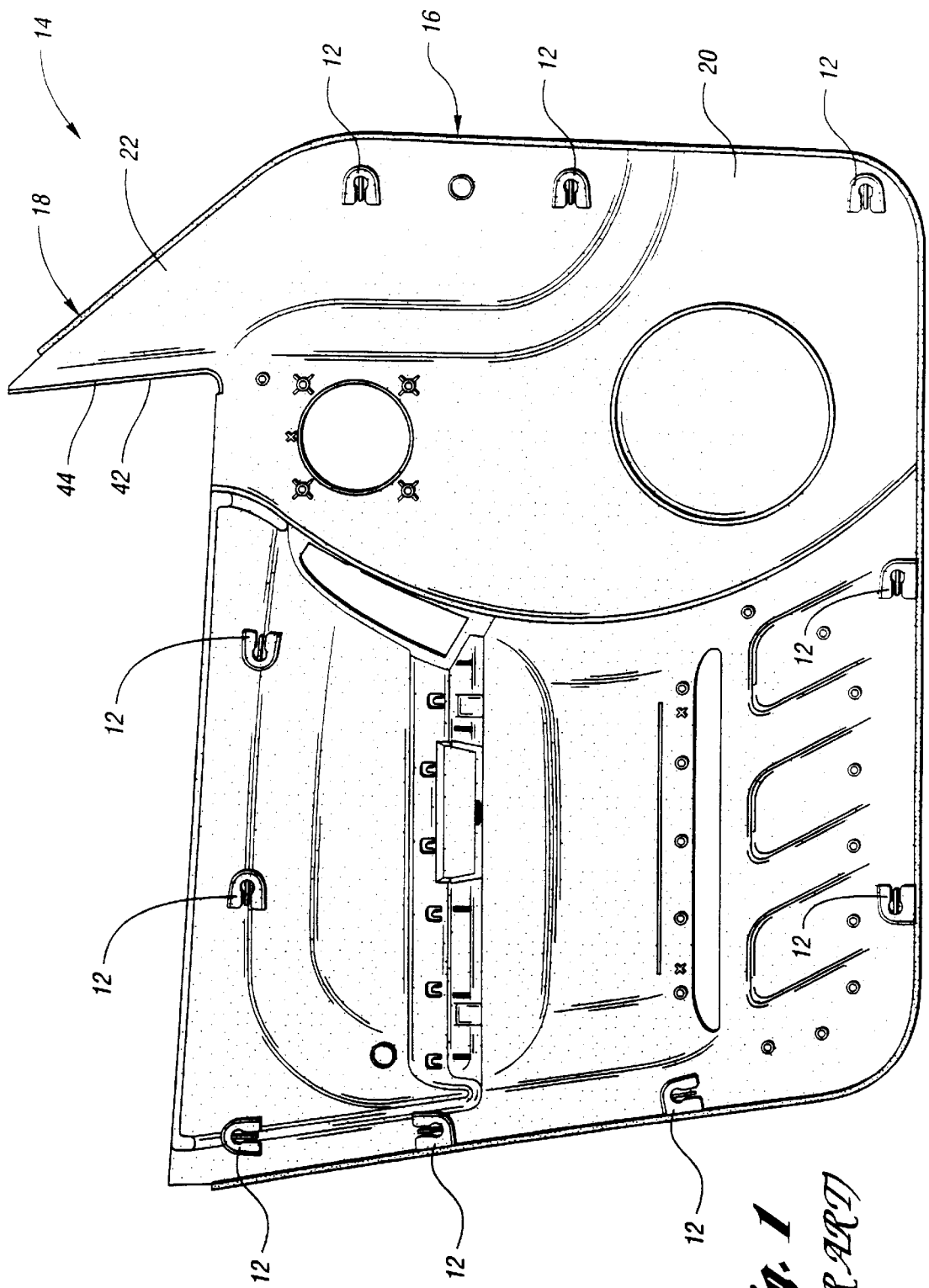
FIG. 1 is a rear elevational schematic view of an automotive interior trim panel of the prior art.
Figure 2:
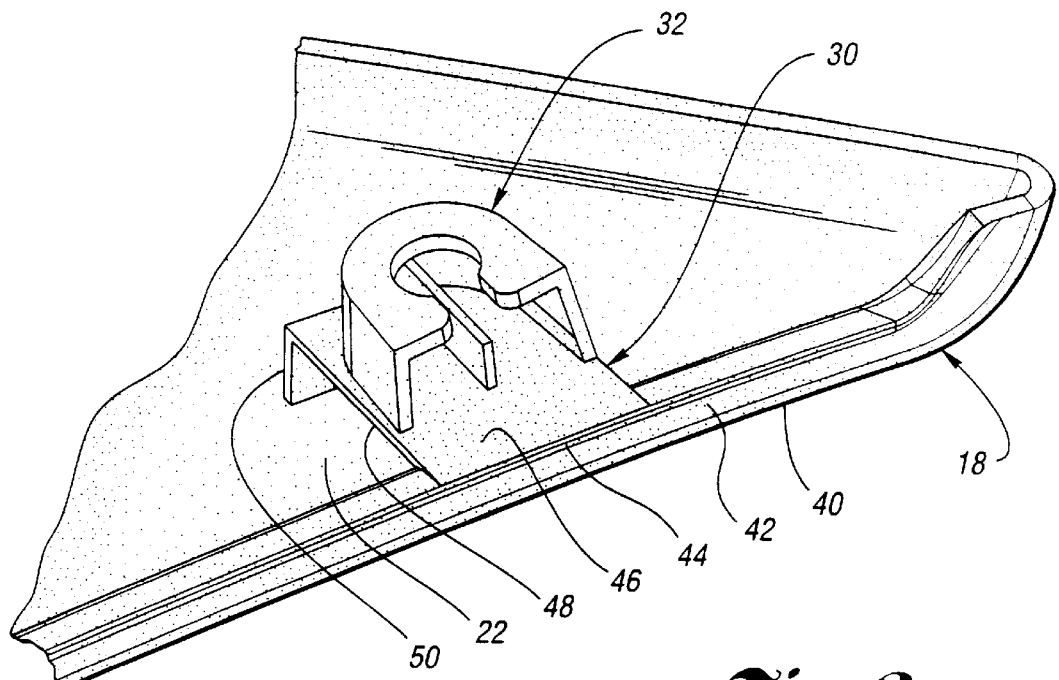
FIG. 2 is a perspective view, partially broken away, of a flag section of the interior trim panel of FIG. 1 and incorporating the present invention.
Figure 3:
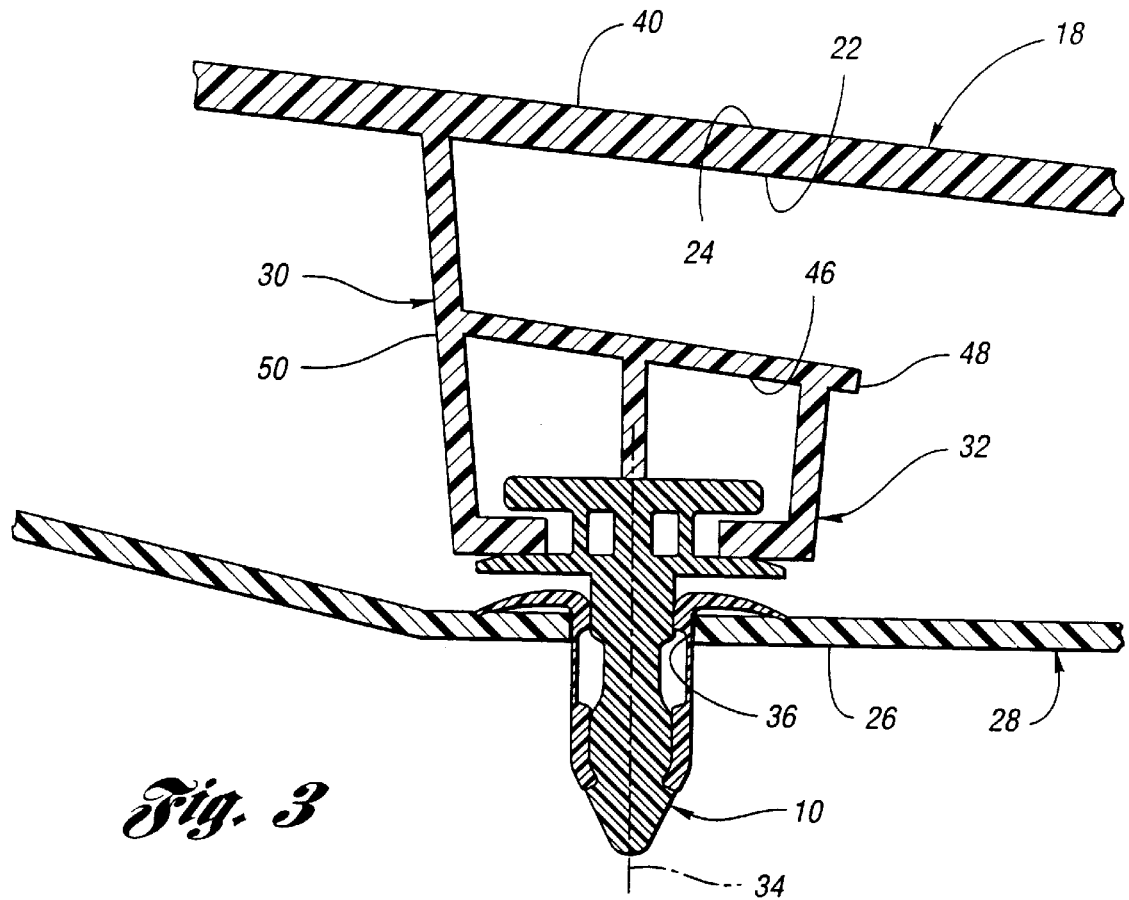
FIG. 3 is a sectional view through the central axis 34, partially broken away, of an automotive trim panel assembly constructed in accordance with the present invention.
Figure 4:
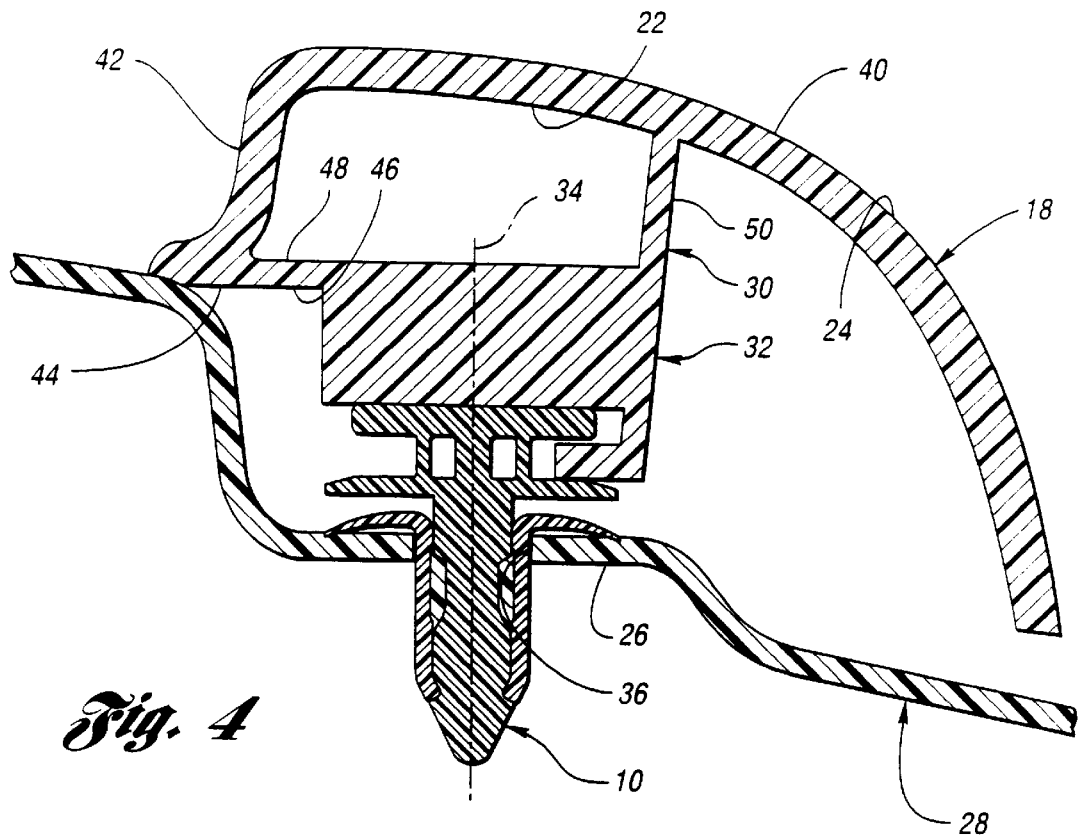
FIG. 4 is a sectional view rotated 90 degrees about the central axis of the assembly shown in FIG. 3.

Referring now to FIGS. 2–4, an interior trim panel 14 of the invention includes a hollow base section, generally indicated at 30, formed on the inner surface 22 of the auxiliary or "flag" section 18. A hollow auxiliary connector portion, generally indicated at 32, is formed on and is supported by the base section 30 above the inner surface 22 of the auxiliary section 18 wherein each of the main and auxiliary connector portions 12 and 32, respectively, having a central axis 34 substantially parallel to each of the other central axes (only the central axis 34 of the auxiliary connector portion 32 is shown for simplicity). The other portions of the interior trim panel 14 are the same as illustrated in FIG. 1.

A plurality of substantially identical pin fasteners (only one of which is shown at 10 with respect to the auxiliary connector portion 32) have central axes coincident with respect to the central axes 34 of their respective connector portions 12 and 32 when the fasteners 10 are received and retained within the main and auxiliary connector portions 12 and 32 (as illustrated in FIGS. 3 and 4) and a plurality of apertures 36 formed through the inner panel 28 to fasten the inner and interior trim panels 28 and 14, respectively together. The central axes of the pin fasteners 10 are all substantially parallel to each other and a body grid (not shown) when the panels 28 and 14 are so fastened.

In particular, the auxiliary section 18 includes a front wall portion 40 and a side wall portion 42 which extends rearwardly from the front wall portion 40. The side wall portion 42 has a back edge surface 44 interconnecting the inner and outer surfaces 22 and 24 respectively, of the auxiliary section 18.

The base section 30 includes an upper support surface 46 for supporting the integrally formed auxiliary connector portion 32 thereon. The back edge surface 44 is substantially coplanar with the upper support surface 46.

The base section 30 includes a base portion 48 having the upper support surface 46 and an inner wall portion 50 connected to the side wall portion 40 and supporting the base portion 48 above the inner surface 22 of the auxiliary section 18.

The inner wall portion 50 is a single curved inner wall portion connected to the side wall portion 42.

The outer surface 40 of the auxiliary section 18 is a Class A surface and the auxiliary section 18 is a flag-shaped section of the interior trim panel 14.

Figure 5:
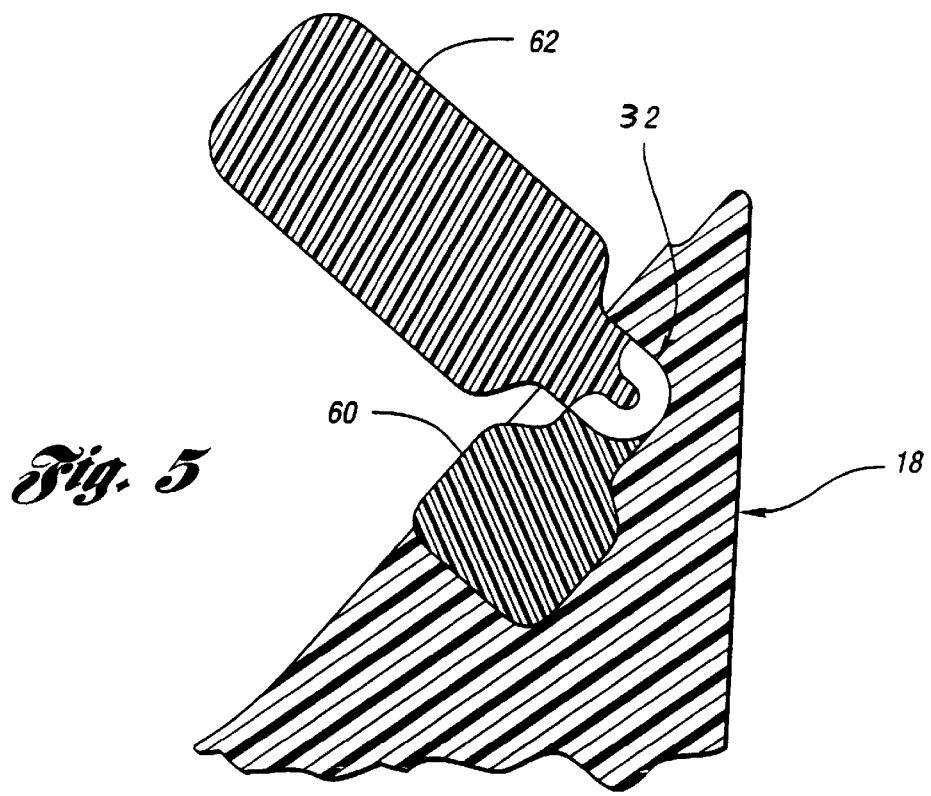
FIG. 5 is a sectional view illustrating tooling for making the flag section incorporating the present invention.

Referring now to FIG. 5, there is illustrated a lifter 60 and a slide 62 for forming the base section 30 and the auxiliary connector portion 32, respectively. The lifter 60 is located within an injection mold whereas the slide is typically located outside the injection mold.

The lifter 60 and the slide 62 are positioned as illustrated in FIG. 5 during a plastic injection step to form the base section 30 and the auxiliary connector portion 32. Both the lifter 60 and the slide 62 are moveable between their extended positions shown in FIG. 5 and retracted positions (now shown).

Because the base section 30 raises the auxiliary connector portion 32, an unsightly hole need not be formed through the side wall portion 42 of the auxiliary section 18 to allow the slider 62 to form the connector portion 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automotive trim panel assembly comprising:
   an inner panel having a plurality of apertures formed therethrough;
   an interior trim panel including a plastic main section having inner and outer surfaces; a plastic auxiliary section having inner and outer surfaces; a plurality of hollow main connector portions formed about the periphery of the main section on its inner surface thereof; a hollow base section formed on the inner surface of the auxiliary section; and a hollow auxiliary connector portion formed on the base section and supported above the inner surface of the auxiliary section; and
   a plurality of substantially identical pin fasteners having central axes and received and retained within the main and auxiliary connector portions and the plurality of apertures to fasten the inner and interior trim panels together wherein the central axes of the pin fasteners are all substantially parallel to each other.

2. The assembly as claimed in claim 1 wherein the auxiliary section includes a front wall portion and a side wall portion which extends rearwardly from the front wall portion, the side wall portion having a back edge surface interconnecting the inner and outer surfaces of the auxiliary section and wherein the base section includes an upper support surface for supporting the auxiliary connector portion thereon and wherein the back edge surface is substantially coplanar with the upper support surface.

3. The assembly as claimed in claim 2 wherein the base section includes a base portion having the upper support surface and an inner wall portion connected to the front wall portion and supporting the base portion above the inner surface of the auxiliary section.

4. The assembly as claimed in claim 2 wherein the inner wall portion is a single inner wall portion connected to the side wall portion.

5. The assembly as claimed in claim 1 wherein the outer surface of the auxiliary section is a Class A surface.

6. The assembly as claimed in claim 1 wherein the auxiliary section is a flag-shaped section of the interior trim panel and wherein the assembly is a door trim panel assembly.

7. A plastic automotive interior trim panel for fastening an inner panel thereto, the interior trim panel comprising:

a plastic main section having inner and outer surfaces;

a plastic auxiliary section having inner and outer surfaces;

a plurality of hollow main connector portions formed about the periphery of the main section on its inner surface thereof;

a hollow base section formed on the inner surface of the auxiliary section; and a hollow auxiliary connector portion formed on the base section and supported above the inner surface of the auxiliary section wherein each of the main and auxiliary connector portions has a central axis substantially parallel to each of the other central axes.

8. A plastic automotive interior trim panel as claimed in claim 7 wherein the auxiliary section includes a front wall portion and a side wall portion which extends rearwardly from the front wall portion, the side wall portion having a back edge surface interconnecting the inner and outer surfaces of the auxiliary section and wherein the base section includes an upper support surface for supporting the auxiliary connector portion thereon and wherein the back edge surface is substantially coplanar with the upper support surface.

9. A plastic automotive interior trim panel as claimed in claim 8 wherein the base section includes a base portion having the upper support surface and an inner wall portion connected to the front wall portion and supporting the base portion above the inner surface of the auxiliary section.

10. A plastic automotive interior trim panel as claimed in claim 9 wherein the inner wall portion is a single inner wall portion connected to the side wall portion.

11. A plastic automotive interior trim panel as claimed in claim 7 wherein the outer surface of the auxiliary section is a Class A surface.

12. A plastic automotive interior trim panel as claimed in claim 8 wherein the auxiliary section is a flag-shaped section of the interior trim panel and wherein the interior trim panel is a door interior trim panel.

* * * * *